US010230241B1

(12) United States Patent
Rule et al.

(10) Patent No.: US 10,230,241 B1
(45) Date of Patent: Mar. 12, 2019

(54) SELF-OPTIMIZING HYBRID POWER SYSTEM

(71) Applicants: Evan T. Rule, Burtonsville, MD (US); Eric B. Shields, Germantown, MD (US); Crystal P. Lutkenhouse, Garrett Park, MD (US); John A. Trehubenko, Arlington, VA (US)

(72) Inventors: Evan T. Rule, Burtonsville, MD (US); Eric B. Shields, Germantown, MD (US); Crystal P. Lutkenhouse, Garrett Park, MD (US); John A. Trehubenko, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 146 days.

(21) Appl. No.: 15/282,517

(22) Filed: Sep. 30, 2016

Related U.S. Application Data

(60) Provisional application No. 62/234,952, filed on Sep. 30, 2015.

(51) Int. Cl.
*H02J 3/00* (2006.01)
*H02J 3/38* (2006.01)
(Continued)

(52) U.S. Cl.
CPC .......... *H02J 3/383* (2013.01); *G05B 13/0205* (2013.01); *H02J 13/00* (2013.01)

(58) Field of Classification Search
CPC ........ H02J 3/383; H02J 13/00; G05B 13/0205
See application file for complete search history.

(56) References Cited

U.S. PATENT DOCUMENTS 5,929,538 A * 7/1999 O'Sullivan ........... H02J 7/1415
307/44
7,469,541 B1 * 12/2008 Melton .................. H02S 20/32
60/641.1

(Continued)

OTHER PUBLICATIONS

R. Palma-Behnke et al., "A Microgrid Energy Management System Based on the Rolling Horizon Strategy," in IEEE Transactions on Smart Grid, vol. 4, No. 2, pp. 996-1006, Jun. 2013.*

(Continued)

*Primary Examiner* — Christopher E. Everett
(74) *Attorney, Agent, or Firm* — Howard Kaiser

(57) ABSTRACT

An exemplary embodiment of the present invention's self-optimizing hybrid power system includes a generator, a solar array, batteries, a GPS, a thermometer, a pyranometer, a power manager, and a computer. The computer: (i) establishes maximum and minimum state-of-charge set points; (ii) receives measurement data from the generator (load), the GPS (location), the thermometer (temperature), and the solar irradiance sensor (solar irradiance); (iii) accesses a historic database that relates to generator load, location, temperature, and solar irradiance; (iv) based on the historic database, predicts a solar profile and a generator load profile; (v) calculates an optimized maximum state-of-charge set point and an optimized minimum state-of-charge set point, based on the predicted solar profile, the predicted generator load profile, the measured location, the measured temperature, and the measured solar irradiance; (vi) transmits control signals to the power manager to vary the maximum and/or minimum state-of-charge set point.

14 Claims, 15 Drawing Sheets

(51) Int. Cl.
*H02J 13/00* (2006.01)
*G05B 13/02* (2006.01)

(56) References Cited

U.S. PATENT DOCUMENTS

| | | | | |
|---|---|---|---|---|
| 2005/0234600 A1* | 10/2005 | Boucher | ............... | G06Q 30/02 700/286 |
| 2008/0217998 A1* | 9/2008 | Parmley | ............... | H02J 1/10 307/65 |
| 2009/0319090 A1* | 12/2009 | Dillon | ............... | G06Q 10/04 700/291 |
| 2010/0138062 A1* | 6/2010 | Zheng | ............... | C10G 1/10 700/291 |
| 2010/0138063 A1* | 6/2010 | Cardinal | ............... | G01W 1/02 700/291 |
| 2010/0198421 A1* | 8/2010 | Fahimi | ............... | H02J 3/32 700/291 |
| 2010/0207452 A1* | 8/2010 | Saab | ............... | F03D 9/007 307/65 |
| 2010/0318297 A1* | 12/2010 | Herzig | ............... | H02J 13/0062 702/3 |
| 2011/0015799 A1* | 1/2011 | Pollack | ............... | B60L 11/1824 700/291 |
| 2011/0035070 A1* | 2/2011 | Kanai | ............... | H02J 3/14 700/288 |
| 2011/0040550 A1* | 2/2011 | Graber | ............... | G06Q 10/06 703/18 |
| 2011/0057512 A1* | 3/2011 | Prax | ............... | H02J 3/382 307/18 |
| 2011/0282600 A1* | 11/2011 | Roesner | ............... | H02S 50/10 702/60 |
| 2012/0089256 A1* | 4/2012 | Marchitto | ............... | F03D 9/00 700/276 |
| 2012/0104785 A1* | 5/2012 | Hixson | ............... | B60P 3/0257 296/24.36 |
| 2012/0319642 A1* | 12/2012 | Suyama | ............... | H02J 3/32 320/101 |
| 2013/0175862 A1* | 7/2013 | Kelly | ............... | H02J 1/14 307/24 |
| 2013/0346054 A1* | 12/2013 | Mumtaz | ............... | H02J 3/383 703/13 |
| 2014/0039710 A1* | 2/2014 | Carter | ............... | G06Q 10/06 700/291 |
| 2014/0136178 A1* | 5/2014 | Meagher | ............... | G06F 17/5009 703/18 |
| 2014/0200723 A1* | 7/2014 | Roy | ............... | G06Q 50/06 700/291 |
| 2014/0350743 A1* | 11/2014 | Asghari | ............... | G05B 13/048 700/297 |
| 2014/0373893 A1* | 12/2014 | Mayer | ............... | G01W 1/10 136/244 |
| 2015/0280489 A1* | 10/2015 | Curlett | ............... | H02J 7/14 307/66 |
| 2016/0028275 A1* | 1/2016 | Kamel | ............... | H02J 13/0006 700/295 |
| 2016/0241042 A1* | 8/2016 | Mammoli | ............... | H02S 40/38 |
| 2016/0254782 A1* | 9/2016 | Leary | ............... | H02S 50/00 250/208.2 |

OTHER PUBLICATIONS

M. Ashari, C.V. Nayar, An optimum dispatch strategy using set points for a photovoltaic (PV)-diesel-battery hybrid power system, Solar Energy, vol. 66, Issue 1, 1999, pp. 1-9.*

Ammar Mohammed, Jagadeesh Pasupuleti, Tamer Khatib, Wilfried Elmenreich, A review of process and operational system control of hybrid photovoltaic/diesel generator systems, Renewable and Sustainable Energy Reviews, vol. 44, Apr. 2015, pp. 436-446.*

* cited by examiner

SELF-OPTIMIZING HYBRID POWER SYSTEM

CROSS-REFERENCE TO RELATED APPLICATIONS

This application claims the benefit of U.S. provisional application No. 62/234,952, filed 30 Sep. 2015, hereby incorporated herein by reference, entitled "Self-Optimization of Hybrid Power Systems," joint inventors Evan T. Rule, Eric B. Shields, Crystal P. Lutkenhouse, and John A. Trehubenko.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to hybrid power systems, more particularly to improving efficiencies of hybrid power systems involving renewable energy such as solar power.

The United States Navy is at the forefront of hybrid power systems design. Navy data demonstrates the need for technology development in various respects, including reduction of liquid fuel consumption and of the dangers and costs of logistics resupply to forward-deployed locations. The Navy is considering more efficient ways of supporting forward-deployed power requirements.

A current approach to supporting ground-based power requirements of the armed services involves deployment of designated electric diesel generators with an equipment set required to provide a specific capability. Depending on many factors, it is incumbent upon the utilities community to determine which generator will support the peak power requirements of a given piece of equipment or capability. Because of inconsistencies in equipment sets, the drastic diurnal and seasonal power fluctuation inherent to the primary energy consumers, and a limited number of fielded generator sizes, properly sizing a generator to its load becomes very difficult, often resulting in underutilized generators.

Navy statistical evidence demonstrates that generators are frequently operated at less than 50% of their rated capacity. In order to achieve established fuel consumption requirements, liquid fuel needs to be continually used at peak efficiency. FIG. 1 illustrates that current program-of-record generators used by the Navy achieve maximum energy production per gallon of fuel at their peak load.

Despite the difficulty associated with predicting peak load for any given system, once loads are employed, they become very predictable from day to day. Two types of loads are typically supported with generators, those that are dedicated or standalone systems, and those that are made up of many components that provide a capability set.

Dedicated loads are very predictable but make up a small percentage of total power consumed by our armed services. Capability sets such as Combat Operations Centers make up the majority of the loads on the battle field but are inconsistently deployed and have great diurnal and seasonal power fluctuation due to fact that over 70% of their power demand is made up by environmental control systems. Despite drastic daily and seasonal fluctuation, typical loads are very consistent in daily energy consumption, making them very predictable. FIG. 2 illustrates the power fluctuation of a large Combat Operation Center with cyclic diurnal behavior.

Due to the many factors that make rightsizing generators to their loads difficult, it has become increasingly apparent that a materiel solution needs to be put in place to achieve Navy/Marine Corps goals for energy savings and increased sustainability on the battlefield. Additional goals set by the Navy have defined specific fuel consumption requirements for a future program-of-record family of hybrid power systems referred to as the Mobile Electric Hybrid Power Systems (MEHPS). These requirements begin to shape what a hybrid power system will look like on the battlefield. Hybrid power systems are typically made up of multiple sources of power generation, energy storage, power electronics, and a control system.

Tri principle, the basic function of a hybrid power system (e.g., a photovoltaic diesel-generator hybrid power system) solves the problem of rightsizing a fuel burning generator to its load, as a properly designed hybrid power system uses available energy storage to load a generator at peak efficiency whenever the generator is running. When the generator is not running, the energy storage and any available "free" or renewable energy will be used to support the load, resulting in efficient consumption of logistics fuel and reduced generator maintenance. Many of the requirements set forth by the procurement offices drive aspects of systems such as energy storage size and the amount of renewable energy required meeting fuel savings goals. In order to meet the MEHPS requirements, renewable energy must be used to supplement a fuel burning generator.

Key performance parameters (KPPs) such as cost, weight, footprint, and setup time heavily drive the maximum capacity of components critical to energy production. Because of these limitations on component size, fuel consumption of a Navy tactical hybrid power system is influenced heavily at low loads by renewable energy and less so at loads between 50 and 100% of the system capacity. Because statistical analysis shows that tactical power systems are often operated at low loads, hybrid power systems provide an operational and economic benefit where they are most typically used; however, significant inefficiencies have been identified in how current hybrid systems use their renewable components.

Current state-of-the-art control architectures for hybrid power systems use hard set points, which are intended to minimize fuel consumption while conservatively utilizing the various components of the system in an attempt to maximize system life. Conservative thresholds can often cause unintentional cyclic behavior of system components because of operating parameters that hover at or near set point thresholds. Additionally, current architectures are designed to a specific application or load profile, resulting in inefficient and inconsistent utilization of renewable resources, which is the most important contributor to reaching energy production goals set by the requirements community.

Hybrid power systems that utilize current control system architectures may be able to achieve specific requirement goals set by procurement offices; however, they will not be able to achieve efficient utilization of system resources consistently throughout the systems operating range. Current systems do not take full advantage of renewable sources, primarily because of: dominance struggles between power sources; unavailability of energy storage to sufficiently store renewable sources when the renewable sources are available; and, conservative set points that may drive fuel burning generators to start unnecessarily.

SUMMARY OF THE INVENTION

All important purpose of exemplary embodiments of the present invention is to maximize the number of kilowatt-hours of energy production per gallon of fuel consumed by a hybrid power system, while preserving the lifespan of the system, through efficiently utilizing the systems components. Consistently maximizing energy production of power systems allows warfighters to sustain or extend their operational reach with a reduced dependency on logistics fuels, as well as to meet evolving requirements set by the acquisition community.

Exemplary practice of the present invention provides an inventive method for reducing inefficiencies identified in current hybrid power system control architectures through continuously modifying system set points based on predicted data. Based on historical loads and resources, the present invention effectuates set-point self-optimization of hybrid power systems. The inventive method can be applied to many applications. The examples of inventive practice that are disclosed herein are more specifically geared toward the expeditionary power requirements of the United States armed services.

An objective of the present invention is to maximize overall energy production of a hybrid power system by maximizing utilization of "free" renewable energy throughout a system's operational power range, despite varying operational scenarios. The inventive technology will minimize unnecessary generator starts and excessive generator runtime, resulting in fuel savings and reduced maintenance cycles on system components. The present invention addresses the inefficiencies besetting current hybrid power systems' control architectures. Exemplary inventive practice predicts daily load profiles and continuously optimizes control system component dispatch strategies to achieve maximum performance throughout the system's operating ranges.

According to exemplary inventive practice, a battery-charging range is established for an electrical generator. The battery-charging range is characterized by a maximum state-of-charge value and a minimum state-of-charge value. Data signals are received by a computer from the generator and from sensors including a global positioning system (GPS), a thermometer, and a solar irradiance sensor (e.g., a pyranometer). The generator, the GPS, the thermometer, and the solar irradiance sensor measure, respectively, generator loads, location, temperature, and solar irradiance. A historic database is accessed relating to the generator loads, the location, the temperature, and the solar irradiance. Based on the historic database, a solar profile and a generator load profile are predicted. An optimized maximum state-of-charge value and an optimized minimum state-of-charge value are determined, based on the predicted solar profile, the predicted generator load profile, the measured location, the measured temperature, and the measured solar irradiance. Based on the optimized maximum state-of-charge value and the optimized minimum state-of-charge value, control signals are transmitted to power manager for varying the maximum state-of-charge value, or the minimum state-of-charge value, or both the maximum state-of-charge value and the minimum state-of-charge value.

Exemplary embodiments of the present invention meet the design challenges associated with commercial and military hybrid power systems. The present invention's innovative trend prediction and control optimization strategies mitigate shortcomings in reliability and performance and enable hybrid power systems to consistently meet the austere requirements set by the Marine Corps.

Hybrid power systems represent a recently developed category of power generation technologies for off-grid applications. A typical hybrid power system includes a combination of a diesel generator, a renewable resource, power electronics/controls, and energy storage. This combination powers electrical loads. These conventional systems function based on fixed set points that govern decision-making on when and how to use different components.

Electric hybrid power systems are typically comprised of multiple sources of power generation, energy storage, power electronics, and a control system that has a common output to support power to the end user. In a typical case of the tactical hybrid power system considered for use by the Marine Corp, the primary components would consist of a diesel generator, photovoltaic arrays, lithium-ion batteries, and a power management component. All of the power generation and storage devices would be converted and distributed by the power management component, which would be controlled by firmware run by an internal computer.

The firmware used by current hybrid power systems relies upon static control parameters. Although hybrid systems are designed to use each component according to its designed use scenario, the logic for hybrid systems is primarily driven by battery state of charge (SOC), which can be derived using several common techniques. Therefore, a battery gauge (e.g., SOC gauge) may be used to represent the static set points that are typically used to control a hybrid power system.

The most common control strategy currently practiced for hybrid power systems is called "cycle-charging," which simply uses SOC thresholds to turn the generator on and off. When the batteries are depleted and reach a "low SOC" threshold, the generator is turned on at which point it charges the batteries at a fixed charge scheme, until they reach a "high SOC" threshold and the generator is turned off. This cycle then repeats itself.

Conventional hybrid power systems use basic "hard" set points, which are chosen to ensure system integrity (e.g., battery life, energy availability) and to maximize fuel savings. While fixed set points can ensure system integrity, fuel savings are often compromised. Engineering efforts have been directed to ensuring reliable system operation rather than optimizing system efficiency, as the latter involves technological hurdles. Hybrid power systems that passively manage power generation resources have a large potential for wasted renewable resources.

Conventional implementation of fixed set points for a hybrid power system fails to maximize hybrid power system performance in a number of ways. This conventional strategy involving "one-size-fits-all" set points does not work well in many day-to-day operations. The detrimental results of these conventional approaches include reduced fuel efficiency, underutilized renewable energy generation, increased maintenance requirements, increased noise, and reduced advantage in return, on investment. The present invention's autonomous set point adaptation and optimization addresses the challenges of improving performance of hybrid power systems.

When cycle charging with solar power, a recharge can often occur prior to sunrise. This often causes wasted solar later in the day. The present invention optimally utilizes solar power through intelligent timing and management of generator starts. Exemplary inventive practice can limit cycle charging during pre-dawn hours, thereby preventing the battery from reaching a high state of charge. The system can be forced to start discharging if the state of charge is too high.

According to exemplary inventive methodology, an inventive practitioner performs steps including the following: (i) formulating a solar profile prediction algorithm; (ii) formulating a load profile prediction algorithm; (iii) based on the solar profile prediction algorithm and the load profile prediction algorithm, formulating a hybrid set point optimization algorithm. The three algorithms (load profile prediction algorithm; solar profile prediction algorithm; hybrid set point optimization algorithm) can be integrated and tested, for instance using multi-day runs in modeling software in a variety of conditions.

Exemplary inventive algorithms are directed to answering certain questions such as when and how much to limit cycle charging, how much to limit cycle charging, whether and when excess solar will be present, and when to start draining the battery to ensure adequate storage space. Exemplary inventive practice seeks to strike a balance in the hybrid power system between storing solar energy when needed and allowing cycle charging at all other times.

The present invention recognizes that hybrid power systems, by their nature, can have operational and environmental data associated therewith. These operational and environmental data are inventively implemented to iteratively adjust set points, thereby improving system performance. Types of such data include but are not limited to the following: solar insolation ($Wh/m^2$/day); temperature; humidity; electrical demand (kW); AC/DC voltages and current; component efficiencies; time of day. Exemplary inventive practice formulates intelligent self-optimizing control algorithms to autonomously self-improve performance.

According to exemplary practice of the present invention's self-optimizing hybrid system, additional instantaneous data inputs are used in conjunction with regional historical data, self-acquired historical data, and optimization algorithms. This inventive combination of information enables the hybrid system to predict the unknowns that impede or prevent power planning. The present invention's self-optimizing hybrid power system is able to make decisions based on predicted data rather than on SOC, which is an instantaneous single data point. This foresight uniquely afforded by the present invention enables the hybrid power system to create additional, "variable" set points, and to vary the "low" and "high" SOC to allow for predicted excess resources or to plan for anticipated resources. Additionally, according to some inventive embodiments, these resources and load demand predictions can allow for alternate generator charging schemes.

BRIEF DESCRIPTION OF THE DRAWINGS

The present invention will now be described, by way of example, with reference to the accompanying drawings, wherein.

DESCRIPTION OF EXEMPLARY
EMBODIMENTS OF THE INVENTION

Figure 1:
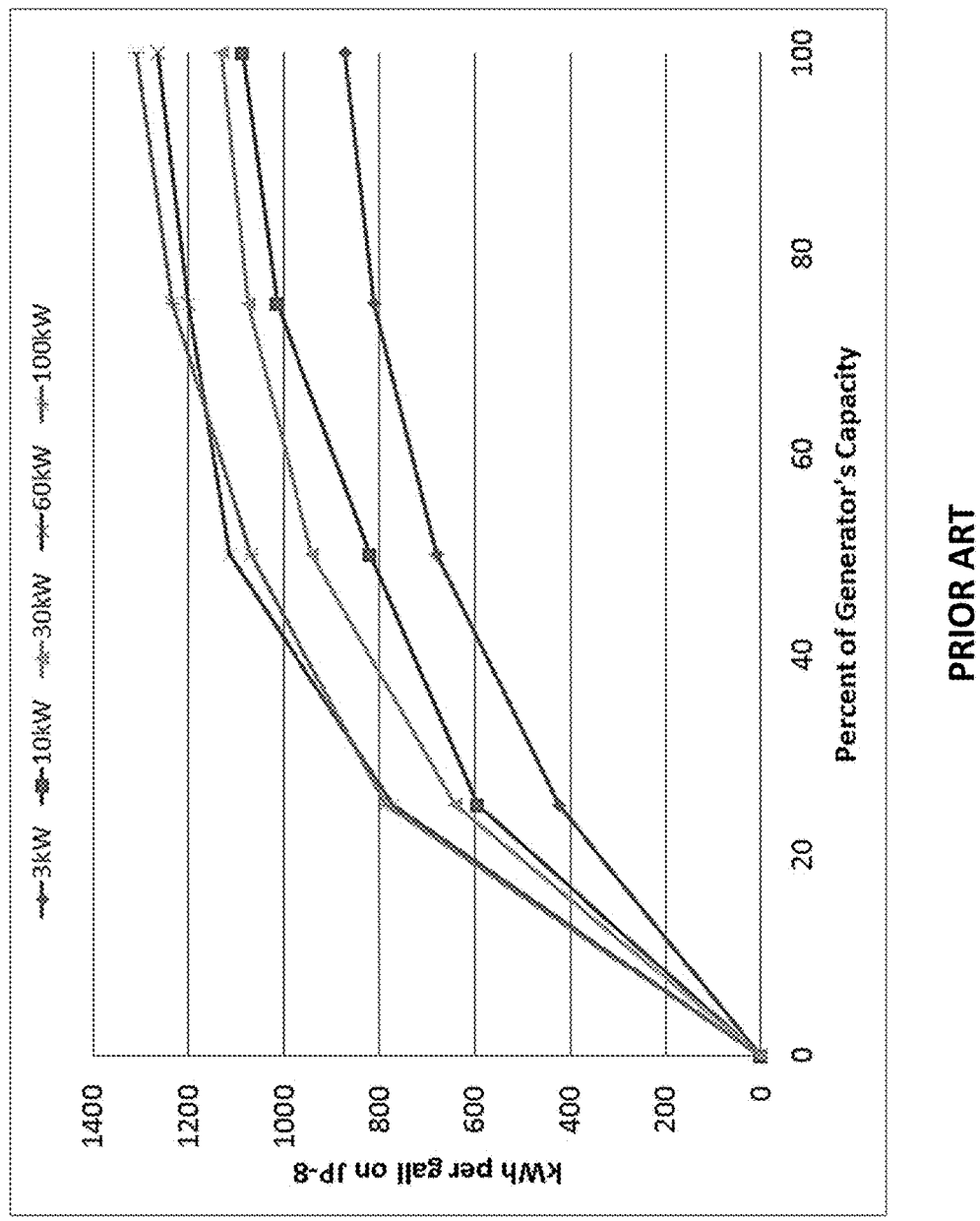
FIG. 1 is a graphical representation of energy production for a current USMC program-of-record generator.
Figure 2:
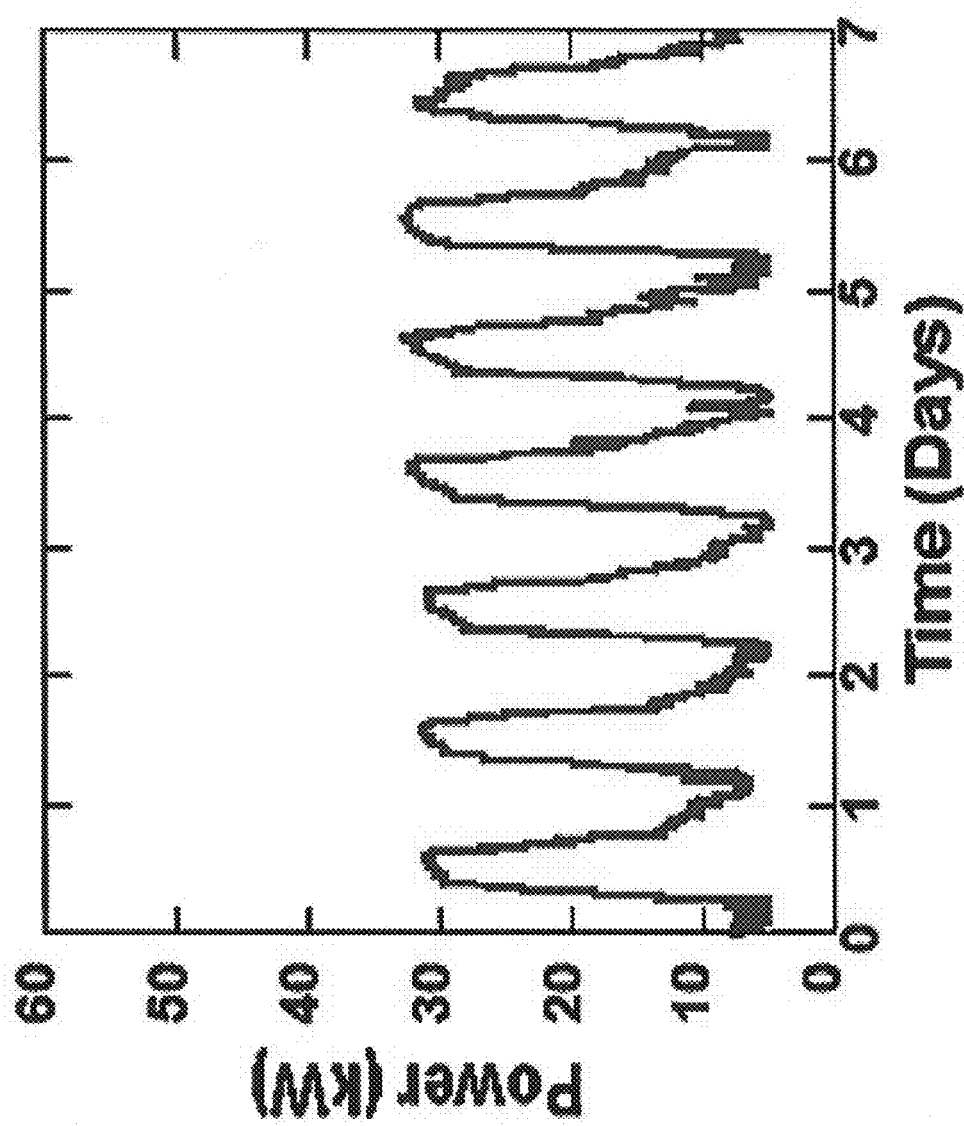
FIG. 2 is a graphical representation of typical diurnal power fluctuation of a large Navy combat operations center.
Figure 3:
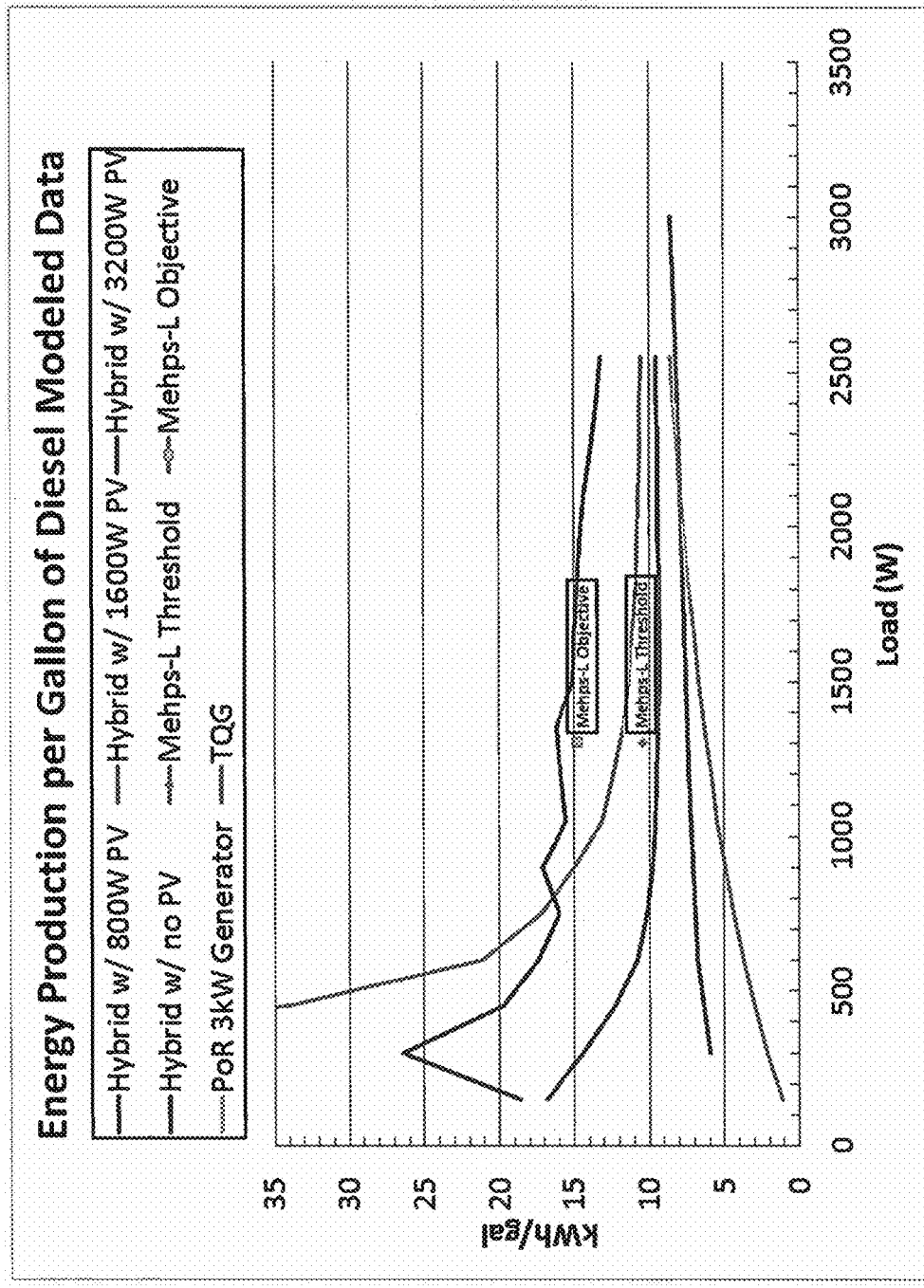
FIG. 3 is a graphical representation of modeled hybrid power systems with varying amounts of renewable energy. Note the dramatic losses in energy production between the hybrid with 3200 W of PV compared to the system with 1600 W of PV.

Reference is now made to FIG. 3, which shows the performance of modeled hybrid power systems using various amounts of renewable energy, in comparison to a standard program-of-record generator. The problem of inconsistent and inefficient utilization of renewable energy is illustrated by the hybrid system modeled with a 3200 W photovoltaic array. When compared to an optimized system with half as much renewable energy, the system with 3200 W of renewables is less efficient at lower loads due to its inability to harvest renewable energy whenever it's available. This is primarily due to the inability of the system to dictate when resources are available and allow sufficient energy storage to accept available renewable sources.

Figure 4:
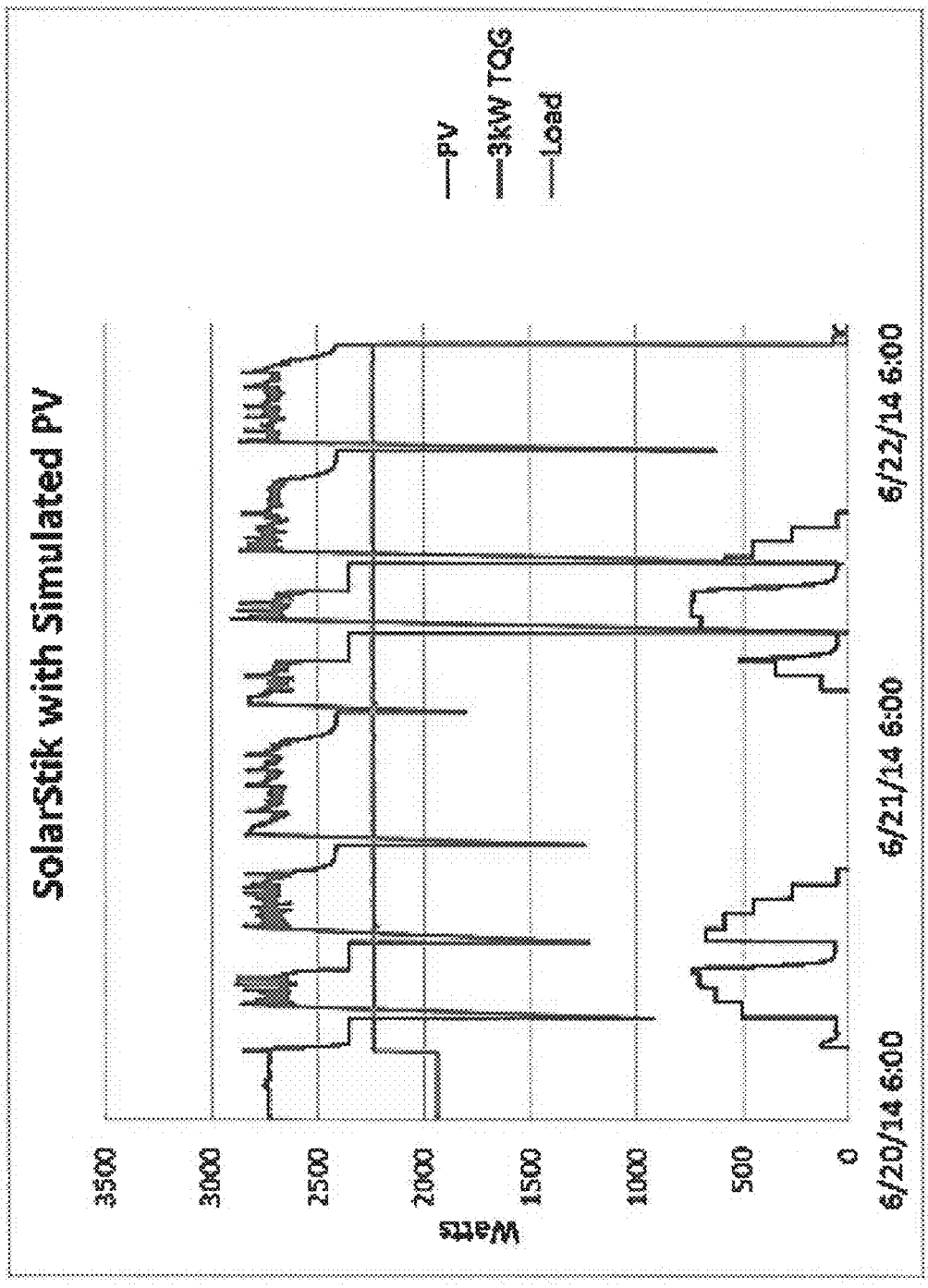
FIG. 4 is a graphical representation of power into a hybrid power system from typical sources relative to load.

FIG. 4 illustrates a power source dominance issue, typical of current hybrid power technologies. This problem allows a generator to be the dominate power source when running, causing the "free" renewable resource to be poorly utilized.

Studies on the impacts of hybrid system components on its performance show that the dispatch strategy of energy storage heavily influences the cyclic behavior of system components, as well as the system's ability to consistently use available power sources that drive energy production. Exemplary practice of the present invention includes implementation of load-and-resource prediction algorithms and optimization algorithms. According to exemplary inventive practice, the inventive load-and-resource prediction algorithms are used in combination with optimization algorithms so as to continuously modify system set points, thereby enabling a hybrid system to fully utilize its resources and minimize cyclic behavior.

Figure 5:
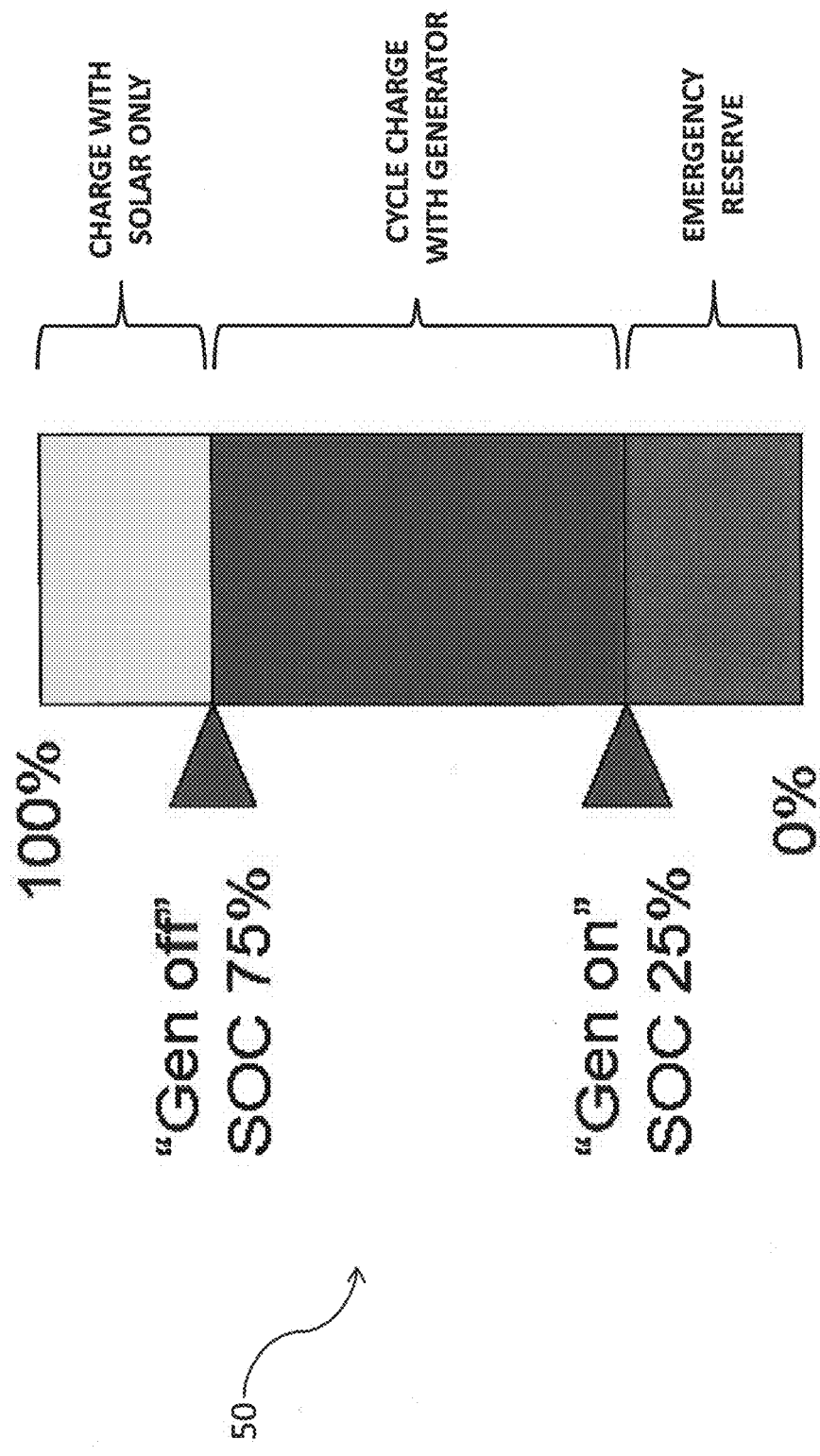
FIG. 5 is a diagrammatic representation of a battery fuel gauge with conservative set points typical of current hybrid power solutions.

With reference to FIG. 5, typical battery usage in hybrid power systems is a tradeoff between using the maximum possible kWh/lb of energy storage onboard a system while achieving an acceptable life cycle. The depth of discharge may range from 50% to 90% depending on battery size, chemistry, and system life cycle requirement. The scenarios illustrated by way of example herein use states of charge consistent with generic lithium-ion batteries.

In furtherance of maximum cycle life, the examples herein of inventive practice use a conservative depth of discharge of 50%, with 25% and 75% being the minimum and maximum states of charge, respectively. It should be noted that repetitive shallow discharge cycles and full charge cycles stress the battery materials, leading to reduction in battery life cycle. FIG. 5 represents what a typical battery fuel gauge 50 would look like on a hybrid power system, with the "Generator on" and "Generator off" set points (indicated by arrowheads on the left hand side) optimized for maximum cycle life.

Figure 6:
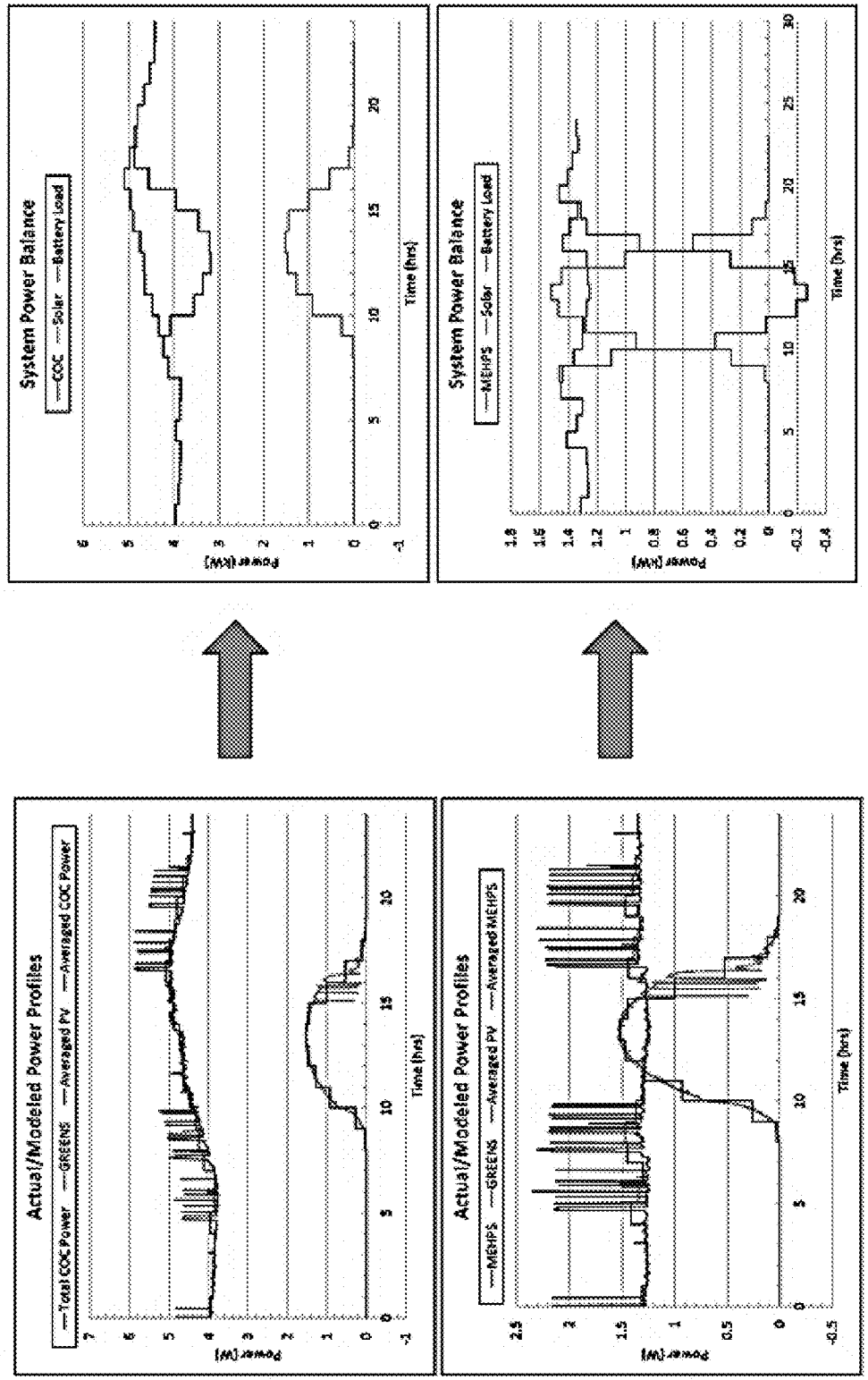
FIG. 6 is a diagrammatic and graphical representation of exemplary power profiles with overlaid representative profiles (left) and representative profiles and calculated battery load profile (right), FIG. 6A through FIG. 6D, respectively, are enlarged versions of the four individual graphs shown in FIG. 6.
Figure 6A:
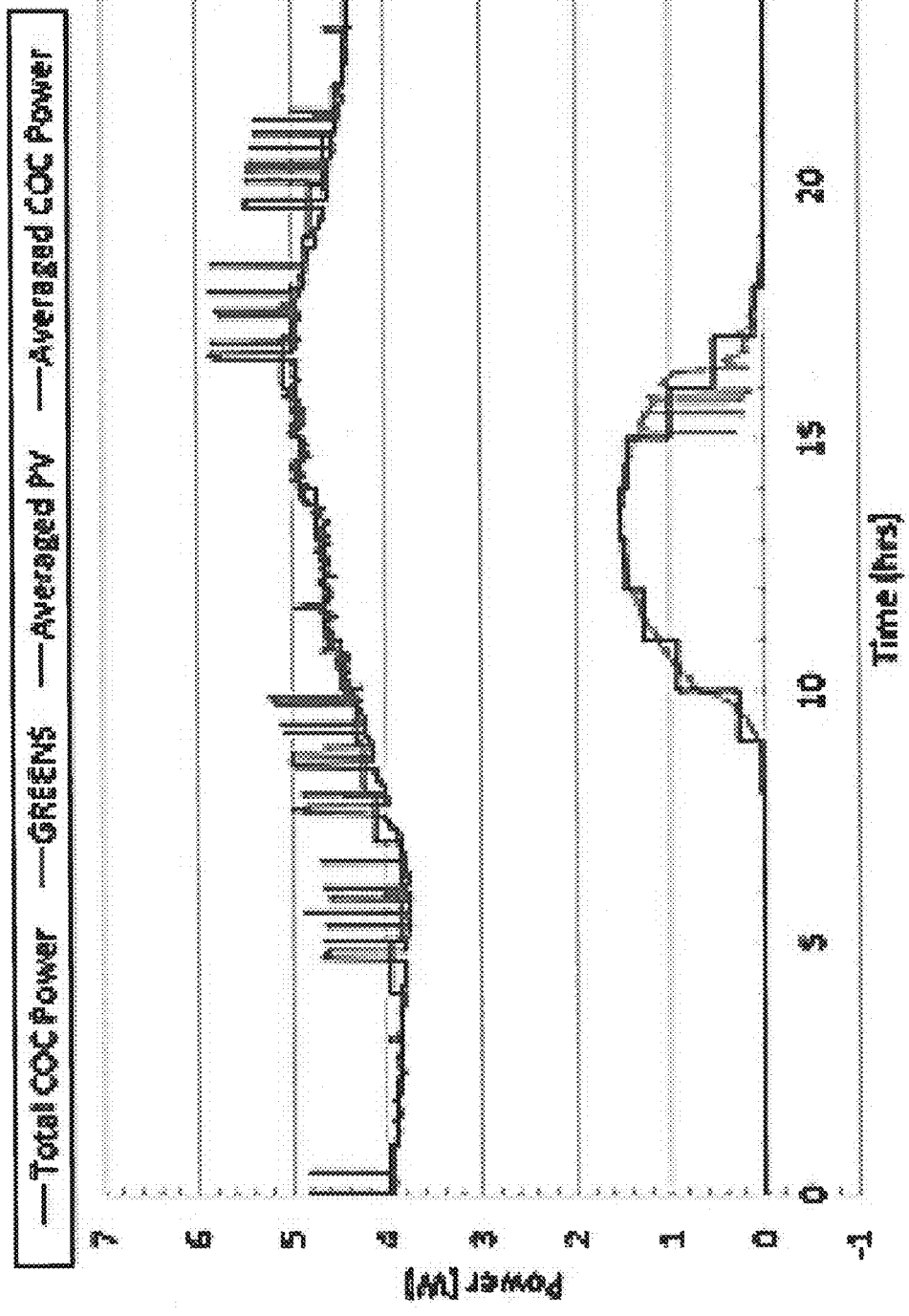
Figure 6B:
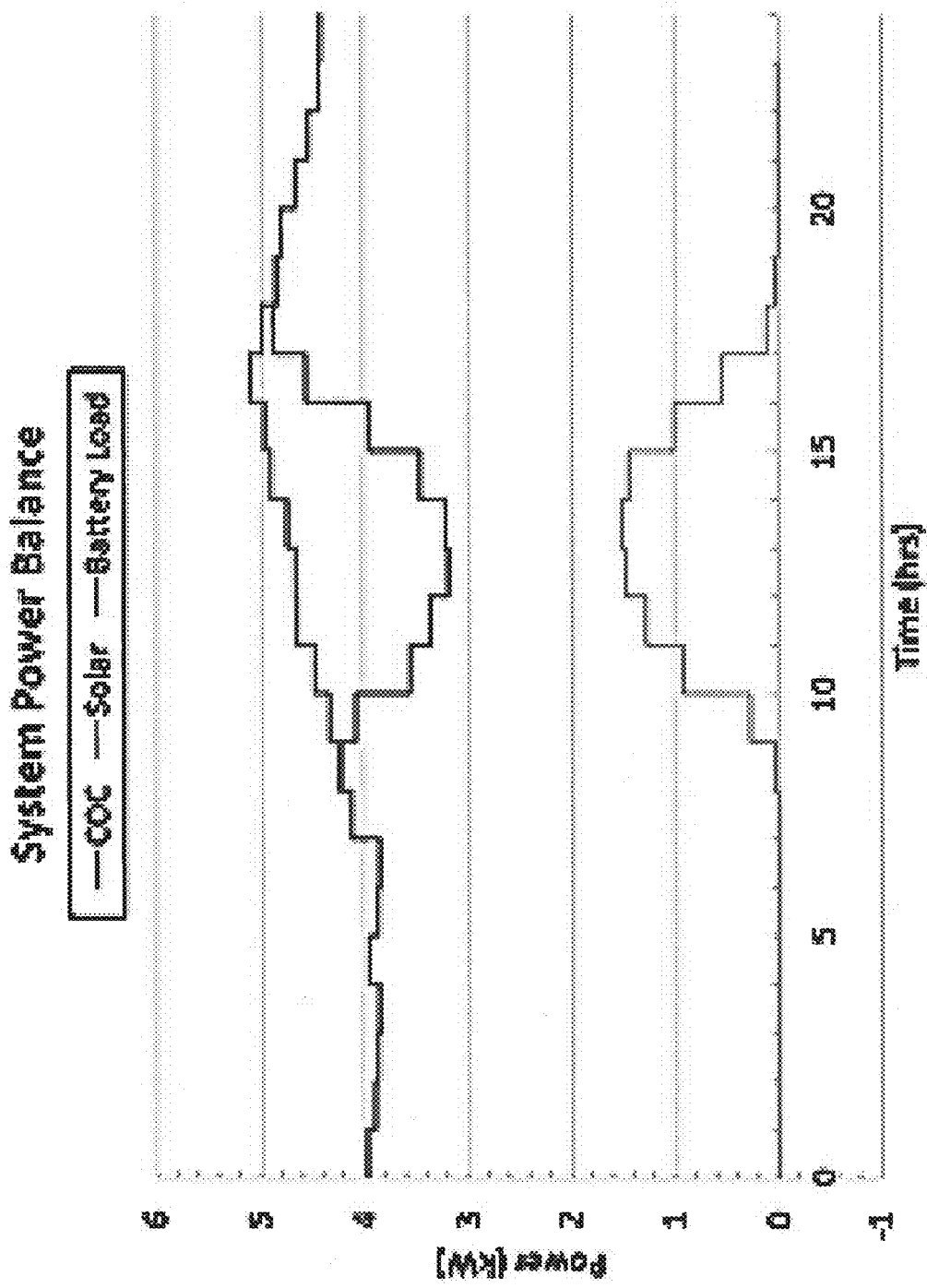
Figure 6C:
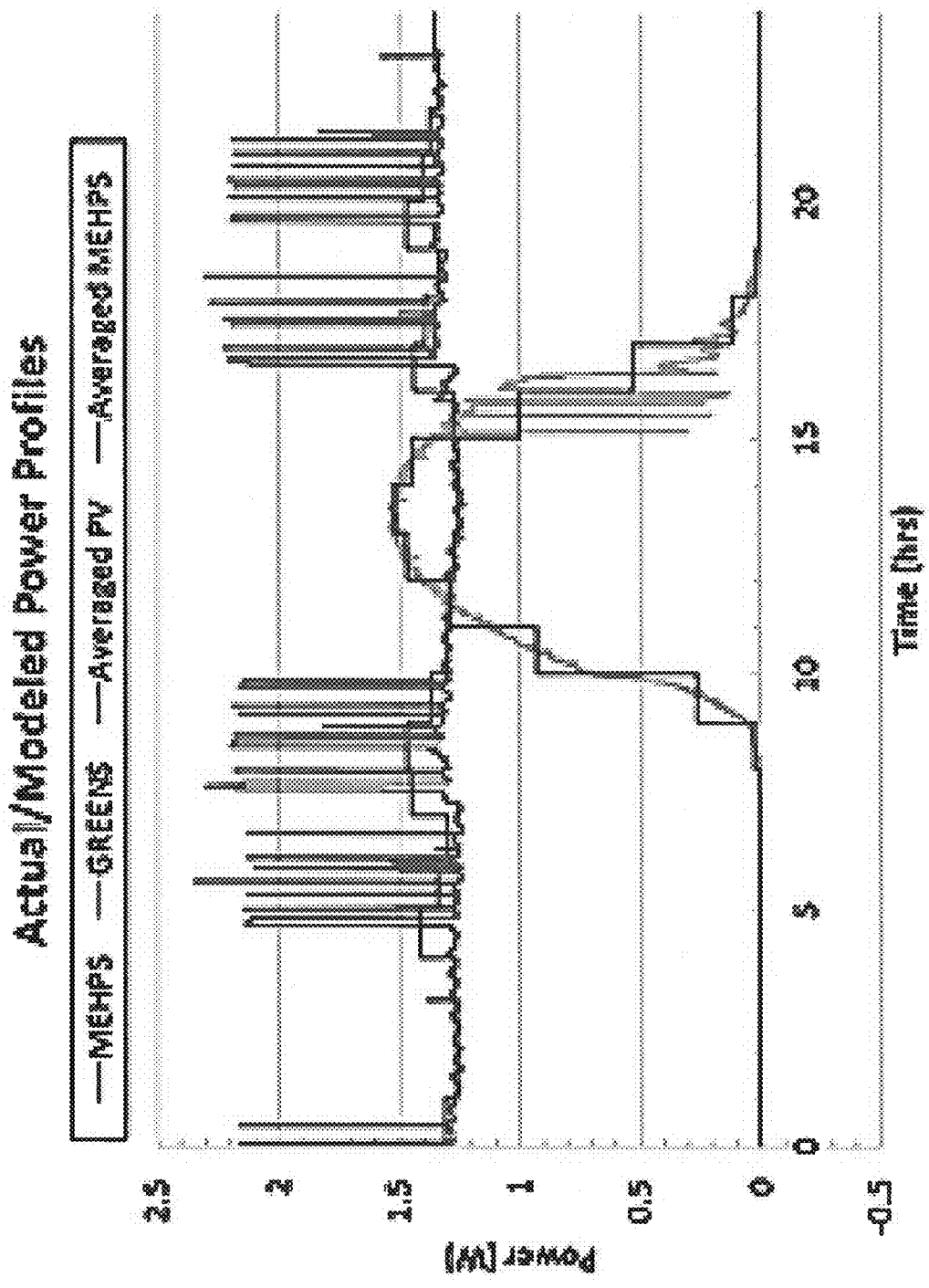
Figure 6D:
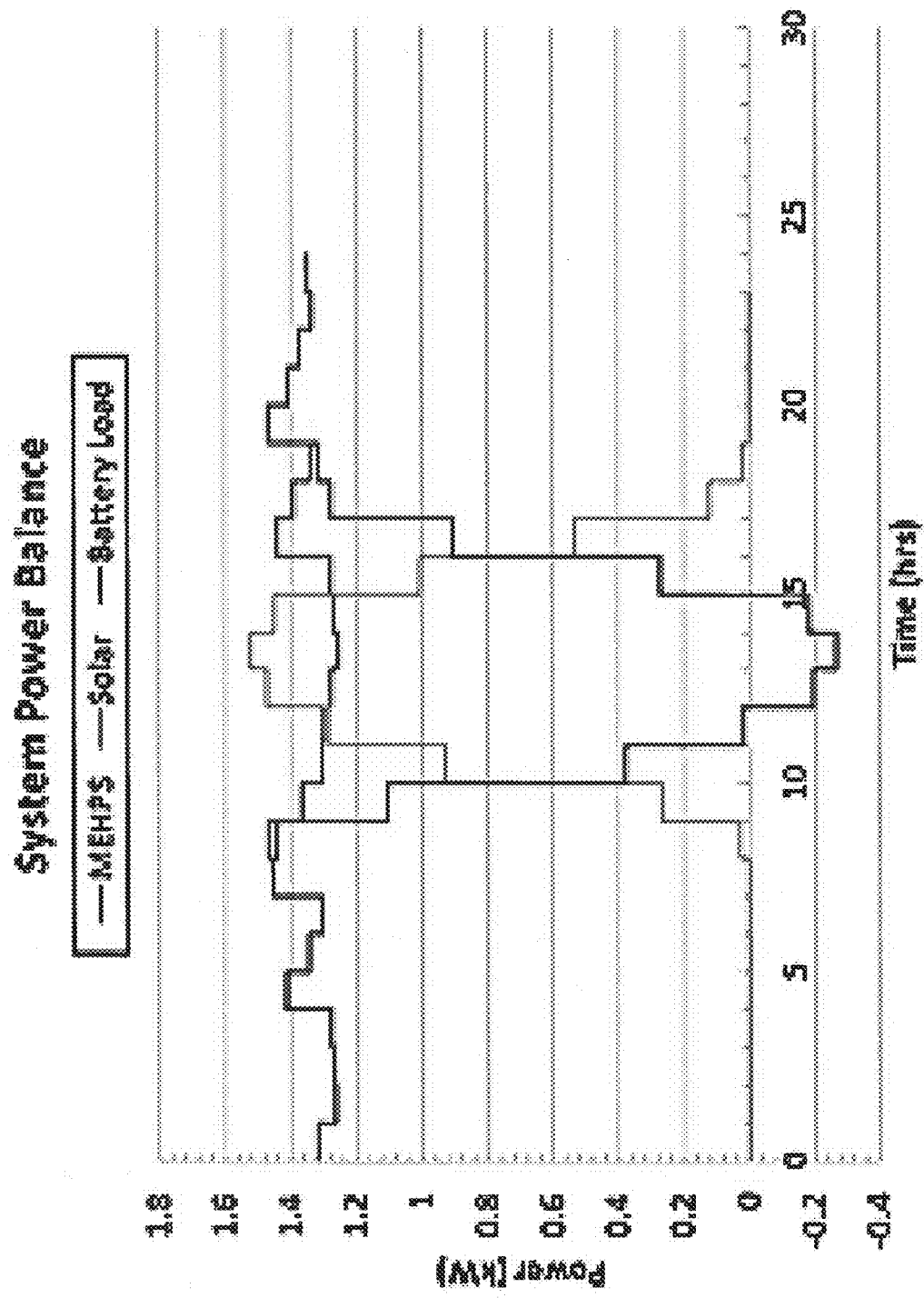

FIG. 6 shows what the representative load profiles for real data may look like for two different load scenarios. A first load scenario is shown in FIGS. 6A and 6B, and a second load scenario is shown in FIGS. 6C and 6D. Battery capacity use strategies in accordance with the present invention can be applied to these and multifarious other scenarios.

With reference to FIG. 7 through FIG. 11, exemplary practice of the present invention features, inter aria, (i) a load-and-resource prediction tool, and (ii) optimization strategies. The prediction tool and optimization strategies are incorporated into a hybrid power system's control software. An exemplary embodiment of the present invention's load-and-resource prediction tool uses representative daily load and resource profiles, created within a hybrid power system, based on each full day of actual data.

The daily profiles of exemplary inventive practice each resemble a block or step profile, initially determined by average hourly data, which filters out transient behavior but is representative of energy consumption, production, and environmental conditions during each profile step. Initially, daily profiles are compared to each other on art hourly basis to create a predicted hourly-averaged profile, with one minute resolution for decision-making during the upcoming day. The predicted profile of exemplary inventive practice is used to identify diurnal power and energy trends, as well as daily and monthly trends, to predict long term fuel consumption and seasonal change. The operational strategy or dispatch strategy for the systems energy storage is modified daily, based on each day's predicted load profile.

In addition to using a predicted load-and-resource profile, real-time data such as temperature and weather predictions are incorporated into the inventive algorithms to alert the control system to anomalies in weather, such as a cold front that would affect environmental control unit energy consumption or rain, which would affect photovoltaic production.

An exemplary inventive concept for optimization leverages excess energy storage capacity not typically used under normal operating scenarios because of impacts it may have on cycle life when used regularly. This excess capacity would be used to ride out periods of time when no solar is available but excess solar is predicted in the near future. This exemplary inventive method is intended to reduce unnecessary generator starts, thereby lowering overall fuel consumption as well as unnecessary generator runtime. In exemplary practice, an inventive system would use the following information to make a decision to change a set point: existing system data; kilowatt hours remaining in the energy storage until a generator is required to turn on; predicted profile data; and kilowatt hours of energy consumed before excess renewable energy is available.

According to an exemplary inventive embodiment, the inventive system determines how many kWh will be required to ride out the normal or conservative "generator on" set point based on predicted load energy, and modify the generator-on state-of-charge (SOC) set point based on that predicted energy requirement. It should be noted that threshold limit will be in place to not allow a set point modification if it would jeopardize system reliability or long term system performance.

Figure 7:
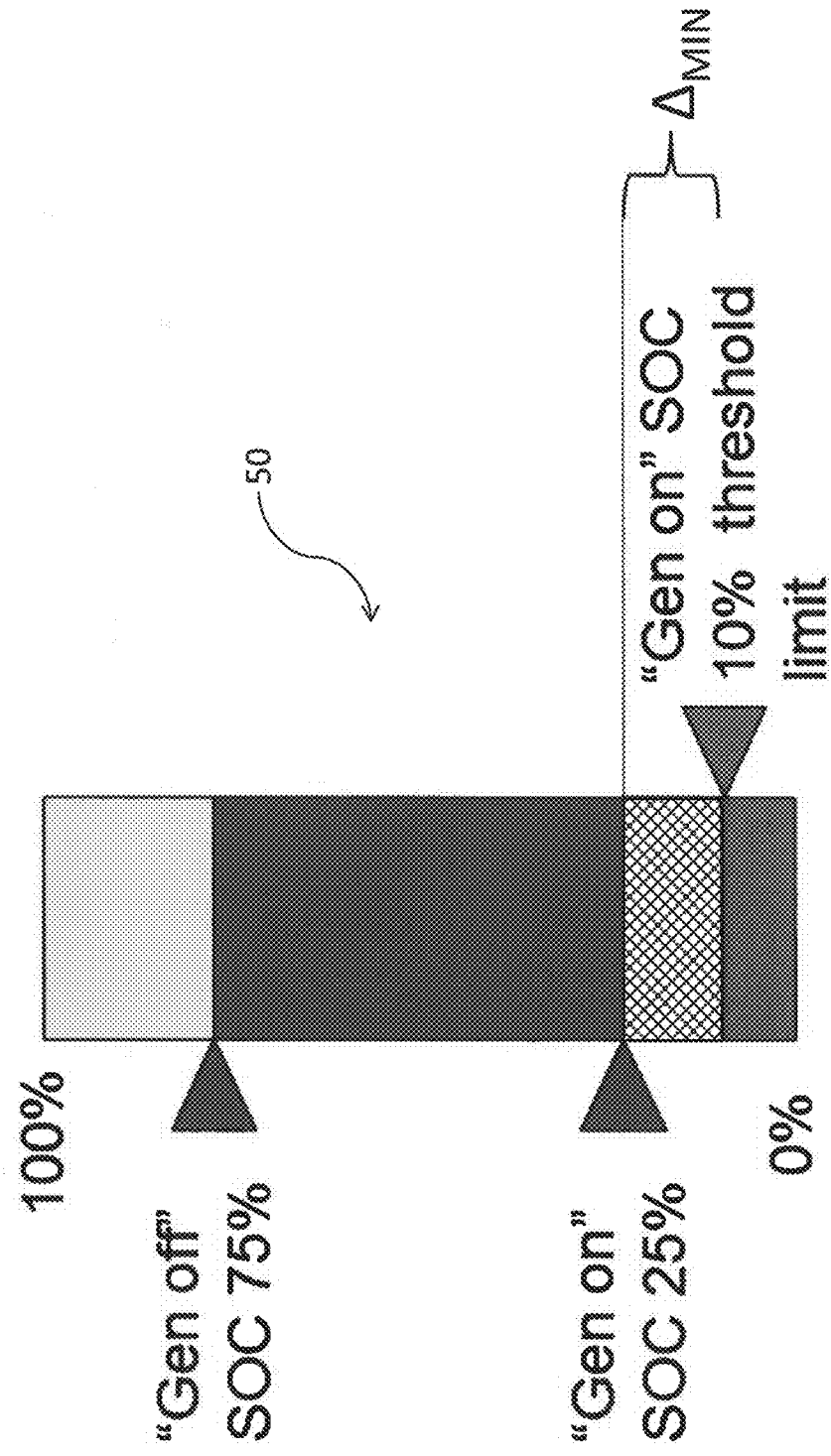
FIG. 7 is a diagrammatic representation, similar to FIG. 5, of a battery fuel gauge of a hybrid power system. Illustrated by way of example in FIG. 7 is headroom for self-optimization for predicted excess renewable energy, in accordance with the present invention.

FIG. 7 shows a battery fuel gauge 50 to illustrate an inventive example of how the battery state of charge can be altered to allow an inventive system to override an unnecessary generator start. The "Gen off" and "Gen on" set points represented on the left side of the fuel gauge 50 are representative of a typical hybrid system's hard set points, and remain in place on a self-optimized system for scenarios where the system does not have sufficient data to predict load and resource data, either from inconsistent weather or because of a lack of employment time.

In the situation illustrated in FIG. 7, the present invention's control system lowers the state-of-charge set point to an optimized state-of-charge set point within the cross-hatched area designated $\Delta_{MIN}$, which is the area between the 25% "Gen on" set point and the 10% "Gen on" threshold limit. Cross-hatched area $\Delta_{MIN}$ represents the present invention's optimization window of the generator-on set point.

Figure 8:
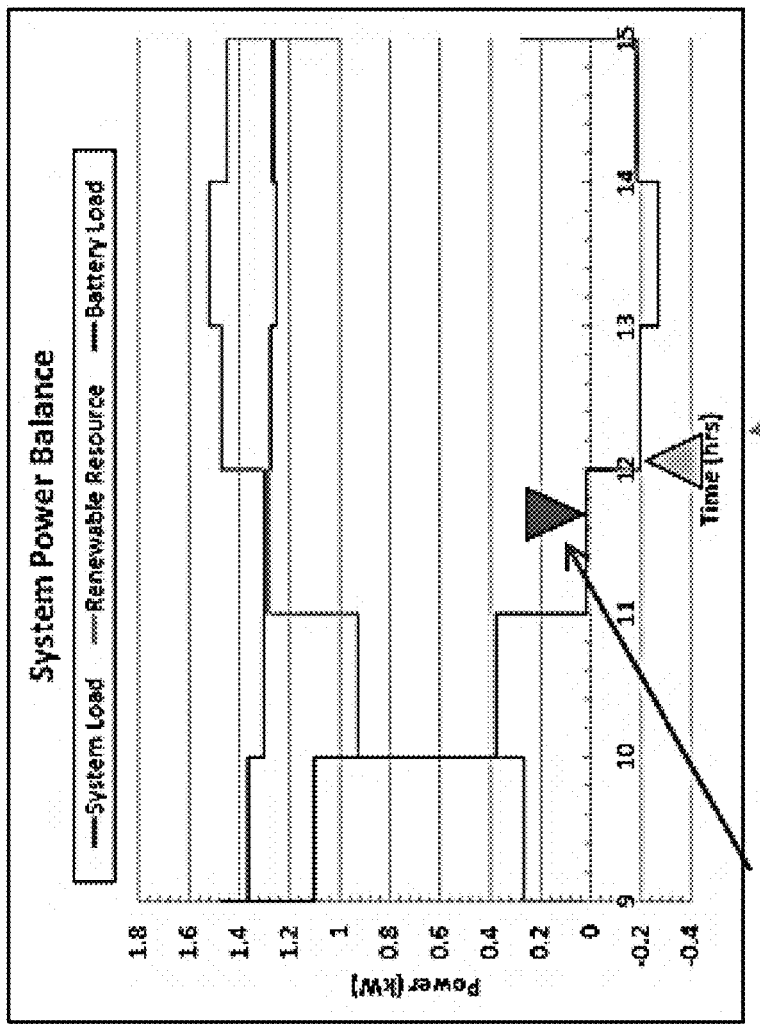
FIG. 8 is a graphical representation illustrating predicted excess renewable energy in a representative profile calculated by real data.

FIG. 8 depicts an example of a predicted power profile in accordance with the present invention. Illustrated in FIG. 8 is the duration of time predicted before excess renewable energy would be available.

Figure 9:
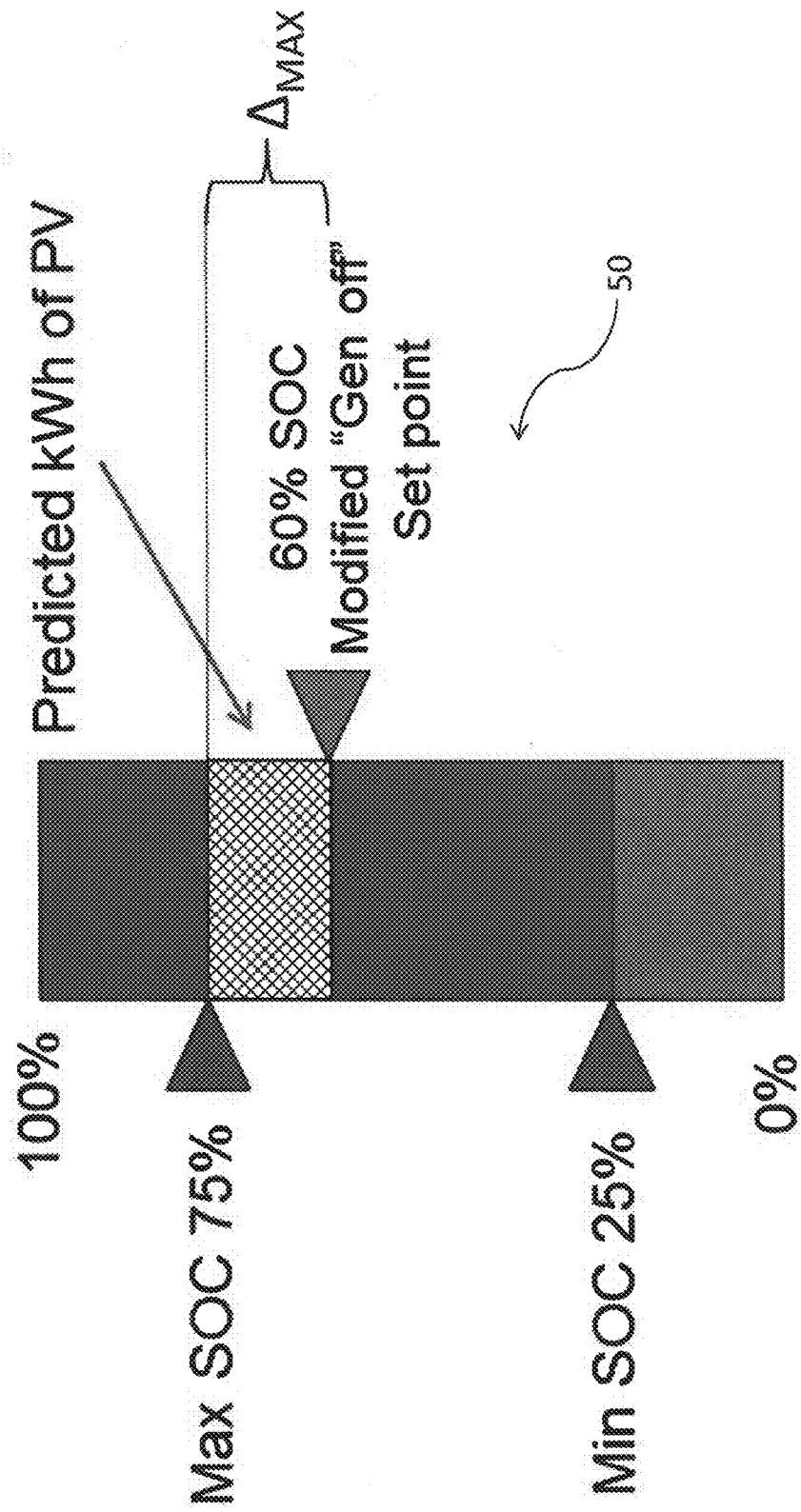
FIG. 9 is a diagrammatic representation, similar to FIG. 5 and FIG. 7, of a battery fuel gauge of a hybrid power system. Illustrated by way of example in FIG. 9 is a situation in which a generator must run to maintain system operations, but excess renewables are predicted to be available before sufficient capacity is discharged from the battery or during the charge cycle, in accordance with the present invention.

With reference to FIG. 9, a different inventive strategy is presented by a situation in which the battery hits its 25% generator-on set point, and does not predict excess renewables in the capacity between 25% and the 10% threshold limit, thus causing the generator to start to reliably support the systems power. With the generator running, typical operations would support the load with generator power and charge the battery with the excess generator power, efficiently loading the generator to 100% load. Under normal scenarios, to minimize generator starts, the generator will charge the battery to full capacity or 75% state of charge as illustrated in FIG. 9; however, as previously mentioned herein, this often results in insufficient energy storage to take advantage of renewable resources.

In the situation illustrated in FIG. 9, the present invention's self-optimizing architecture will lower the conservative generator-off set point from 75% to a state of charge that allows the total predicted excess capacity to be stored in the battery. That is, the control system will lower the state of charge set point to an optimized state of charge maximum set point in the hatched area designated $\Delta_{MAX}$, which is the area between the 75% "Gen off" set point and the 60% "Gen off" threshold limit.

Additionally, in exemplary inventive practice the max state of charge can be raised to allow for storage of unanticipated renewable energy. FIG. 9 represents what the battery fuel gauge 50 might look like in such a situation. Cross-hatched area $\Delta_{MAX}$ represents the present invention's optimization window of the generator-off set point. The cycle-charging upper limit is automatically adjusted, based on projected discharge rates and anticipated solar excess, thereby ensuring the availability of battery storage.

Figure 10:
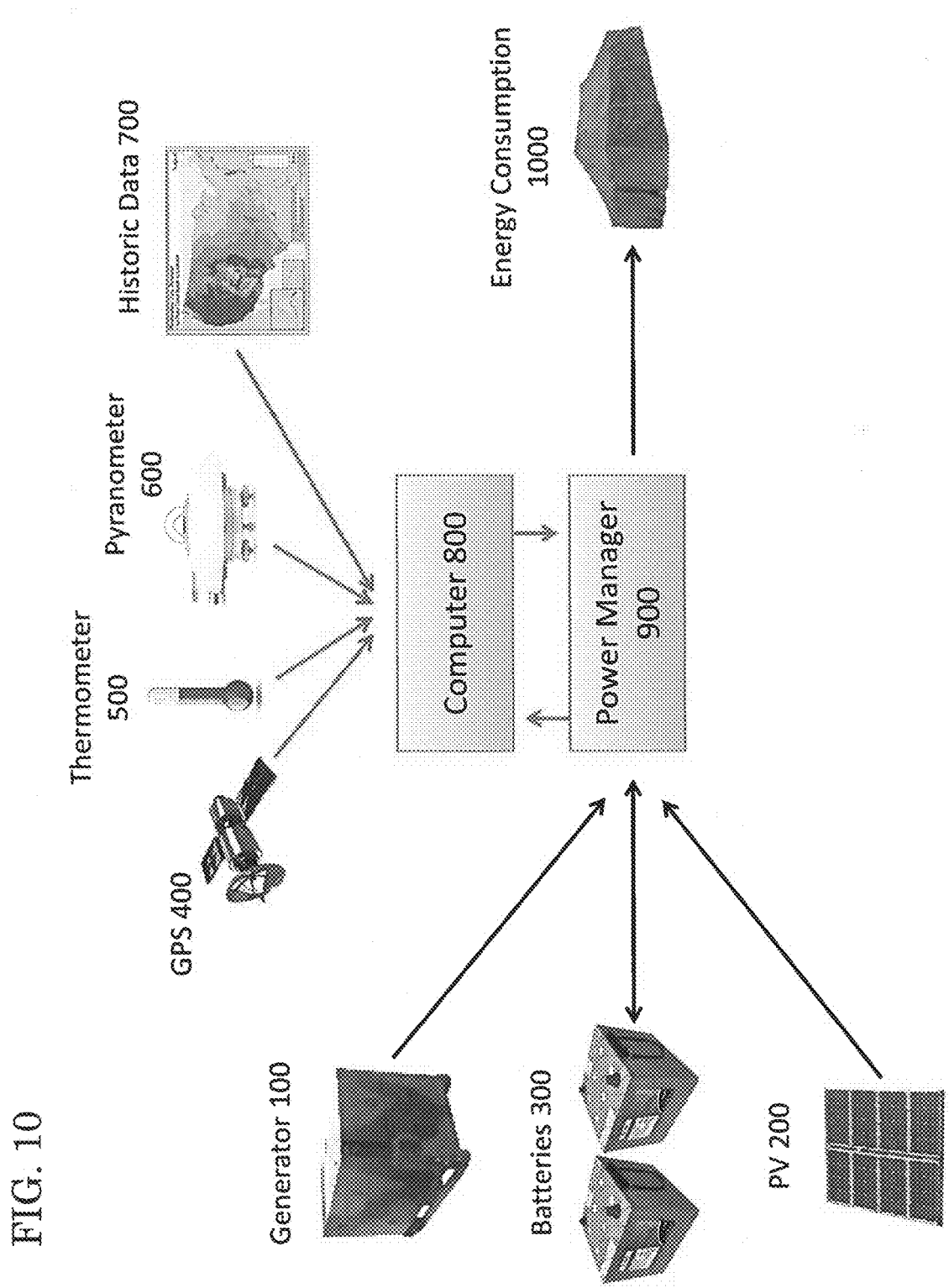
FIG. 10 is an apparatus schematic of an example of a self-optimizing hybrid power system in accordance with the present invention.
Figure 11:
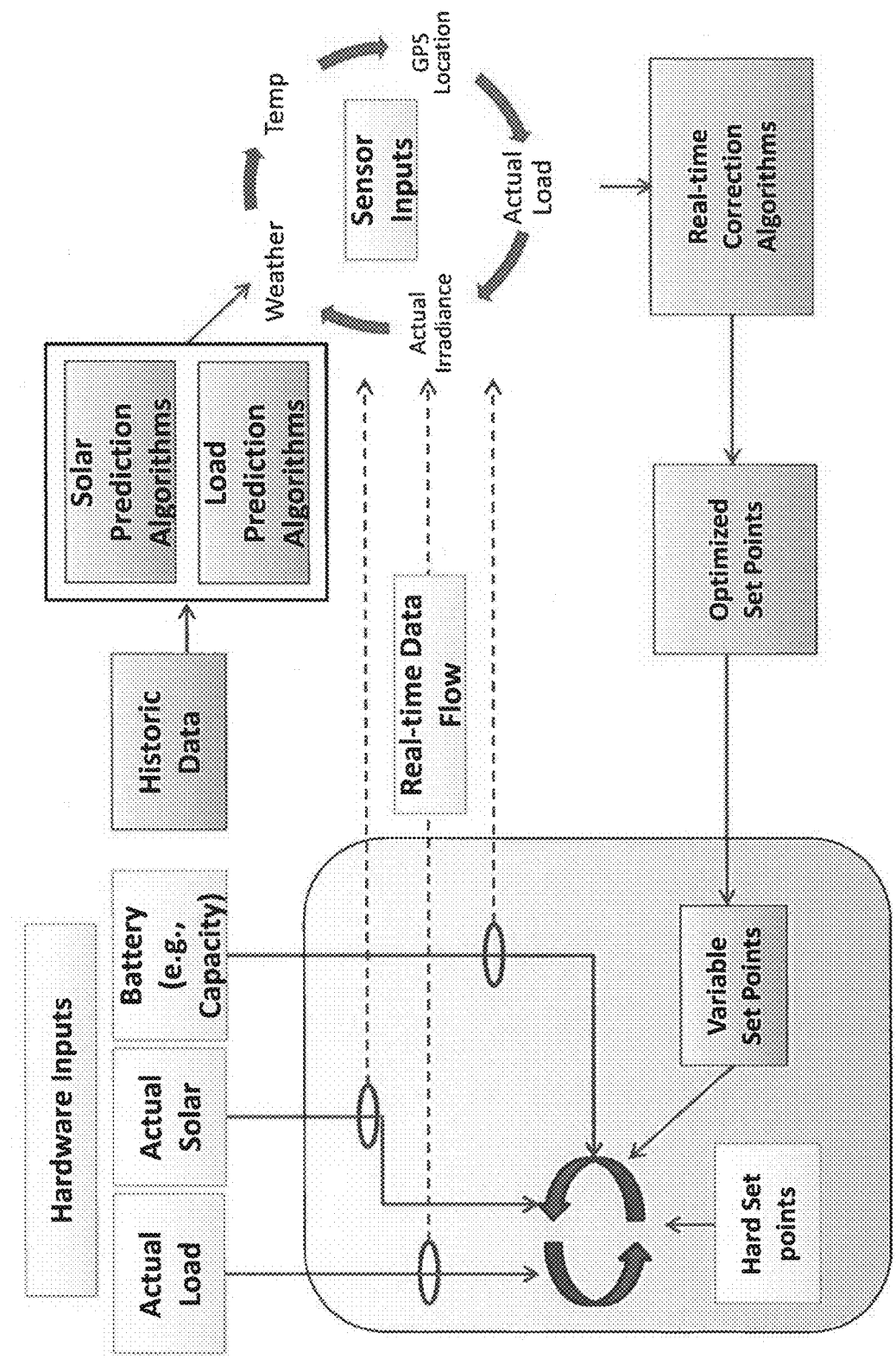
FIG. 11 is a method schematic of an example of a self-optimizing hybrid power system in accordance with the present invention.

Particularly with reference to FIG. 10 and FIG. 11, exemplary inventive practice of hybrid optimization implements a combination of devices and computer data and software, and effects an integration strategy with respect to these elements. As shown in FIG. 10, exemplary inventive hybrid power apparatus includes a generator 100, a photovoltaic system (e.g., including one or more solar panels) 200, at least one battery 300, a global positioning system 400, a thermometer 500, a solar irradiance sensor (e.g., pyranometer) 600, historical data 700, a computer 800, a power manager 900, and an energy consumer 1000. An inventive embodiment may include one or more of any of these parts and components.

Computer 800 (which includes a processor and a memory) receives sensory inputs from sensors including GPS 400, thermometer 500, and pyranometer 600. In addition, computer 800 has resident in its memory historical data 700. Sensory signals from sensors 400, 500, and 600, along with historical data 700, are processed by computer 800, executing inventive algorithmic software resident in computer 800's memory. Connected to computer 800 is power manager 900, which receives control commands from computer 800 and accordingly controls (i) the charging of batteries 300 by generator 100 and by photovoltaic (solar energy) system 200, and (ii) the delivery of power from batteries 300 to energy use destination 1000.

The range of battery 300 charging by generator 100 is defined in terms of percentage of the overall (100%) capacity of a battery 300. For instance, as illustrated herein by way of example with reference to FIGS. 5, 7, and 9, the generator's battery-charging range can have a preset (default) maximum value of 75% and a preset (default) minimum value of 25%. Power manager 900 continually adjusts the minimum value and/or the maximum value of the range of cyclical charging of batteries 300 by generator 100. Each of the minimum value ("Min SOC") and the maximum value ("Max SOC") can be adjusted either upward or downward.

FIG. 9 shows an example of downward adjustment of the Max SOC. FIG. 7 shows an example of downward adjustment of the Min SOC. Exemplary inventive optimization will adjust, either upward or downward, either or both of the Max SOC or the Min SOC. In an ongoing manner, based on the sensory and historical information received, the computer algorithmically determines how to optimally adjust the range of battery-charging by the non-renewable energy source (e.g., diesel generator), thereby adjusting the range or ranges of battery-charging by the renewable energy source (e.g., array of solar panels).

For instance, if greater amounts of solar energy are anticipated to be collected by the solar panels, then: (i) the upper (Max SOC) value of the generator's battery-charging range can be adjusted downward, and/or (ii) the lower (Min SOC) value of the generator's battery-charging range can be adjusted upward, thereby creating more room in the battery for charging by the solar panels. On the other hand, if lesser amounts of solar energy are anticipated to be collected by the solar panels, then: (i) the upper (Max SOC) value of the generator's battery-charging range can be adjusted upward, and/or (ii) the lower (Min SOC) value of the generator's battery-charging range can be adjusted downward, thereby creating less room in the battery for charging by the solar panels.

As illustrated in FIG. 11, exemplary inventive practice provides for at least five sensor inputs (weather, temperature, GPS location, measured load, and measured irradiance). A real-time correction algorithm utilizes sensor inputs, historical data, and prediction algorithms (solar prediction algorithm, load prediction algorithm) to calculate optimized set points Max SOC and MM SOC. The battery charging is thus characterized by two fixed set points (default Max SOC and default Min SOC) and two variable set points (adjusted Max SOC and adjusted Min SOC). The two variable set points are continually adjusted in real time to optimal respective values. A physical battery gauge 50 can be used by an inventive practitioner to monitor or visualize set point variations.

An exemplary software model is capable of analyzing input variables (such as voltage and current, weather conditions, time of day, GPS location, electrical demand, battery health, and state of charge), and using those variables to calculate system performance metrics. Such performance metrics may include fuel efficiency, expected battery lifetime, system maintenance requirements, and durations of generator operation (e.g., noise). The inventive software model can then be used to: (i) predict future conditions based on available inputs and historical data; (ii) run excursions which vary system set points and identify set points which maximize performance. Using an inventive model iteratively in this fashion on an hourly, daily, or weekly basis, with reasonable bounds for the maximum and minimum values of variable set points, enables the inventive self-optimization to occur.

Exemplary embodiments of inventive algorithms provide control logic of hybrid generators in order to achieve particular requirements. For instance, inventive practice can ensure that a program of record (POR) is successful and maximizes the number of kilowatt-hours of energy production per gallon of fuel consumed by a hybrid power system through efficient management of system resources. Exemplary inventive methodologies reduce inefficiencies identified in current hybrid power system control architectures through continuously optimizing system set points based on predicted data.

Inventive technologies (e.g., algorithms and operational concepts) can be developed as software upgrades to an existing control architecture of a hybrid power system. Inventive load and resource profile recognition and creation tools can function at capacities exceeding the inputs that were available to the original hybrid power systems. The self-optimization portion of the inventive software can be fully integrated into the control software. Exemplary inventive software affords profile recognition and creation and control system optimization. The present invention may provide for integration of real-time inputs for purposes of adding greater accuracies to predicted profiles.

Inventive technologies can thus be integrated into an existing Navy model. For instance, an inventive integration package may include a load profile generator, a load and resource recognition tool, a load and resource profile prediction tool with real-time profile optimization algorithms, and battery dispatch optimization strategies. Additionally incorporated may be the "fingerprint" database and "fingerprint" recognition algorithms. These inventive technologies can be integrated to form a new, inventive model. The inventive model can be run with several load profiles to show before-and-after utilization of a hybrid system's components to quantify the impacts of self-optimization based on real loads that will be supported by hybrid power systems. Furthermore, the inventive model can be run with an inventive random load generator to confirm its ability to self-optimize consistently under unknown load conditions.

Exemplary inventive practice features, inter alia, a historical resource and load based profile generation tool. An advantage of exemplary inventive practice over current technologies is that exemplary inventive practice enables the system to accurately predict real-time energy consumption and production of the system, allowing for continuous set point optimization. In contrast, current systems are optimized, upon initial design, to specific load scenarios specified by a requirement. The present invention's prediction and optimization strategy affords two different technological approaches that, in combination, enable the hybrid power system to take advantage of resources by managing and continuously changing battery set points, which drive the behavior of the system's power generation components.

The inventive methodology of automated load prediction is unique. Optimization of the operational strategies of hybrid power systems cannot be accurately performed by any conventional methodology. Such optimization can only be accomplished, in accordance with the present invention, through knowledge of what system sources and loads will look like on a daily basis.

To date, industry has not delivered a hybrid power system capable of meeting the Marine Corps' needs for efficient resource utilization. Conventional approaches implement static system set points that are optimized for specific load scenarios, often provided by procurement offices as a "best guess." Such load profiles are unrealistic and rarely seen under typical use scenarios.

The present invention recognizes and addresses significant deficiencies in hybrid technology. In order to optimize component utilization, the present invention characterizes both loads and resources and conducts a balance of systems needs as employment conditions change. The inevitable adverse effects of independent variables—such as system state, renewable resource availability, and load variation—can be mitigated through continuously varying component dispatch strategies based on predicted and real-time balance of systems. The technologies described in this document include load and resource prediction algorithms, which can be incorporated into hybrid power systems control software for use in active decision-making.

Exemplary inventive practice includes trend prediction. An exemplary inventive embodiment of its load and resource prediction tool uses representative daily load profiles, created within the systems, based on historical data collected by a hybrid system during each unique employment. According to exemplary inventive practice, a time-based-average method is utilized to develop a basic power profile. However, inventive software may utilize a combination of statistical techniques such as resolved phasor-based event mapping, which may significantly increase accuracy and the system's ability to identify mid track unknown loads on a grid.

Some of the predicted profiles currently considered by the present inventors resemble a block or step profile, determined by average hourly loads, which filter out transient loads but are representative of energy consumption and production during each profile step. Ongoing Navy research on the impacts of hybrid power system behavior with respect to load profile variation may influence the present inventors' resolutions and end states of the predicted profiles.

The technical challenges associated with trend prediction lie not only within the statistical assessments of base profiles, but also within the adjustments of base profiles as real-time events change both energy production and consumption. In addition to daily parameters, the inventive prediction can provide weekly and monthly trends to predict long term fuel consumption and seasonal change, which will help to ensure optimal base set points. FIG. 6 shows what the representative load profiles for real data may look like for two different load scenarios.

Exemplary inventive practice includes self-optimizing dispatch strategies. The operational strategy or dispatch strategy for the system's energy storage has been identified by the present inventors to be the most influential component under many circumstances, and will be modified daily based on each days predicted load profile and resource profiles. In addition to using a predicted load and resource profile, real-time data such as temperature and weather predictions can be incorporated into the inventive algorithms to alert the control system to anomalies in weather, such as a cold front that would affect environmental control unit energy consumption, or rain that would affect photovoltaic production.

Once a hybrid system according to exemplary inventive practice has the ability to characterize its load and resource behavior, set points can then be adjusted to achieve the appropriate balance between system performance and component life cycle. System performance and component lifecycles can be optimized by mapping performance as a function of specific system set points relative to resource and load conditions. The present invention's efficiency mapping can be conducted, for instance, in an existing Navy model, and can be unique to a specific hybrid power system based on both hardware and control strategies.

Exemplary inventive practice includes load identification through reconstruction of electrical activity from calibrated quasi-static field measurements. In order to further increase the accuracy of predicted load profiles, hybrid power systems can be inventively programmed to recognize specific loads and load behaviors on the system's bus and modify daily predicted load profiles as unexpected loads are introduced the system.

For instance, the Navy can develop a high rate "fingerprint" database for a limited quantity of military equipment. This portion of the effort can leverage existing R&D work in resolving phasor feature vectors for use in identifying and classifying both known and unknown loads, and correlating load events to energy consumption on power grids. The inventively generated data base can then be inventively used to recognize specific pieces of equipment as it is introduced to a hybrid system's load bus, and to modify predicted profile accordingly. Additionally, capability in development of data trend recognition for aviation platforms, for instance, can be leveraged for the development of inventive algorithms that would aid in the recognition and classification of loads.

Exemplary embodiments of an inventive algorithm will make projections based on anticipated solar and load, and satisfy the following:

$$SOC_{max}(t_0) \leq \left[1 - \gamma \int_{t_0}^{t} \frac{\eta(t) P_{battery}}{E_{battery}} d\tau \right]$$

for any $t, t_0$ such that $\begin{cases} t_{dawn} < t < t_{dusk} \\ t_{dusk} - 24 < t_0 < t_{noon} \\ t_0 < t \end{cases}$ Given a system energy transfer efficiency function, $$\eta(t) = \eta_0 \left(\frac{P_{battery}}{P_{max}}\right)^2 + \eta_1 \left[1 - \left(\frac{P_{battery}}{P_{max}}\right)^2\right]$$

Battery charging is given by energy balance:

$$P_{battery} = P_{solar} + P_{gen} - P_{load}$$

The present invention's algorithmic optimizer will make projections of when the generator will start and stop according to the following dynamics:

$$P_{gen} = \begin{cases} 0 & \kappa = 0 \\ P_{gen,max} & \kappa = 1 \end{cases}$$

$$\kappa_{i+1} = \begin{cases} 0 & SOC \geq SOC_{max} \\ \kappa_i & SOC_{min} < SOC < SOC_{max} \\ 1 & SOC \leq SOC_{min} \end{cases}$$

Exemplary inventive practice of solar profile prediction can include calculation and determination of any or all of the following: solar irradiance (e.g., based on laws of blackbody radiation and the geometry of the earth's orbital eccentricity); atmospheric effects (e.g., absorption and scattering of light by earth's atmosphere; distance that the light travels through the atmosphere, which is angle dependent; atmospheric thickness; zenith angle); solar angles (e.g., equation of time; local solar time; zenith angle; declination angle; azimuth angle); irradiance on a surface (e.g., direct normal irradiance; diffuse horizontal irradiance; global tilted irradiance); a solar scattering model (e.g., typical clear day at sea level; clearness index and normalized clearness index; characterization of the solar profile, given a location and time of year and based on clearness index and normalized clearness index); solar pattern identification and prediction (e.g., determining clearness and diffusion coefficients at different times of the day; variable conditions due to weather; fixed conditions due to location and geography; pyrometer used to determine actual irradiance; neural network used to learn patterns of clearness index variability); solar output prediction (neural network used to identify solar panel output characteristics; panel efficiency; dirty panels; misaligned panels; distinguishing between a drop in power availability versus underutilization; identifying loss of correlation between irradiance and panel output); an artificial neural network interface (ANN) (e.g., selecting appropriate inputs to the ANN; selecting an optimal ANN topology; identifying solar output deviations; predicting solar irradiance trends; choosing one ANN or two ANNS having separate panel power and solar trend predictions; input nodes, such as pyrometer reading, panel power output, time of day, ideal irradiance, future time; output nodes, such as solar power available, clearness index, diffuse factor; hidden nodes).

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. Hybrid power apparatus comprising a generator, a solar energy device, at least one battery, a global positioning system, a thermometer, a solar irradiance sensor, a power manager, and a computer, said computer having computer code characterized by computer program logic for efficiently using said hybrid power, said computer code being executable by said computer so that, in accordance with said computer program logic, said computer performs acts including:
   establishing a battery-charging range for said generator, said battery-charging range characterized by a maximum state-of-charge value and a minimum state-of-charge value;
   receiving data signals from said generator, said global positioning system, said thermometer, and said solar irradiance sensor, said generator measuring generator loads, said global positioning system measuring location, said thermometer measuring temperature, said solar irradiance sensor measuring solar irradiance;
   accessing a historic database relating to said generator loads, said location, said temperature, and said solar irradiance;
   predicting a solar profile and a generator load profile, said predicting based on said historic database;
   determining an optimized said maximum state-of-charge value and an optimized said minimum state-of-charge value, said determining based on the predicted said solar profile, the predicted said generator load profile, the measured said location, the measured said temperature, and the measured said solar irradiance, wherein at least one of said determining of said optimized maximum state-of-charge value and said determining of said optimized minimum state-of-charge value is performed iteratively;
   transmitting control signals to said power manager for varying at least one of said maximum state-of-charge value and said minimum state-of-charge value, said transmitting of said control signals based on the optimized said maximum state-of-charge value and the optimized said minimum state-of-charge value.

2. The hybrid power apparatus of claim 1, wherein said maximum state of charge value is either a fixed maximum state of charge value or a variable maximum state-of-charge value, and wherein said minimum state of charge value is either a fixed minimum state-of-charge value or a variable minimum state-of-charge value.

3. The hybrid power apparatus of claim 1, wherein said state-of-charge value is defined as a percentage of the overall capacity of said at least one battery.

4. The hybrid power apparatus of claim 1, wherein said solar irradiance sensor is a pyranometer.

5. The hybrid power apparatus of claim 1, wherein said generator is an electrical generator.

6. The hybrid power apparatus of claim 1, wherein said generator is a diesel generator.

7. A computer-implemented method for using hybrid power, the computer-implemented method comprising:
   establishing a battery-charging range for a generator, said battery-charging range characterized by a maximum state-of-charge value and a minimum state-of-charge value;
   receiving data signals from said generator, a global positioning system, a thermometer, and a solar irradiance sensor, said generator measuring generator loads, said global positioning system measuring location, said thermometer measuring temperature, said solar irradiance sensor measuring solar irradiance;
   accessing a historic database relating to said generator loads, said location, said temperature, and said solar irradiance;
   predicting a solar profile and a generator load profile, said predicting based on said historic database;

determining an optimized said maximum state-of-charge value and an optimized said minimum state-of-charge value, said determining based on the predicted said solar profile, the predicted said generator load profile, the measured said location, the measured said temperature, and the measured said solar irradiance, wherein at least one of said determining of said optimized maximum state-of-charge value and said determining of said optimized minimum state-of-charge value is performed iteratively;

transmitting control signals to said power manager for varying at least one of said maximum state-of-charge value and said minimum state-of-charge value, said transmitting of said control signals based on the optimized said maximum state-of-charge value and the optimized said minimum state-of-charge value.

8. The computer-implemented method of claim 7, wherein said maximum state of charge value is either a fixed maximum state of charge value or a variable maximum state-of-charge value, and wherein said minimum state of charge value is either a fixed minimum state-of-charge value or a variable minimum state-of-charge value.

9. The computer-implemented method of claim 7, wherein said state-of-charge value is defined as a percentage of the overall capacity of said at least one battery.

10. The computer-implemented method of claim 7, wherein said solar irradiance sensor is a pyranometer.

11. The computer-implemented method of claim 7, wherein said generator is an electrical generator.

12. The computer-implemented method of claim 7, wherein said generator is a diesel generator.

13. Hybrid power apparatus comprising a generator, a solar energy device, at least one battery, a global positioning system, a thermometer, a solar irradiance sensor, a power manager, and a computer, said computer having computer code characterized by computer program logic for efficiently using said hybrid power, said computer code being executable by said computer so that, in accordance with said computer program logic, said computer performs acts including:

establishing a battery-charging range for said generator, said battery-charging range characterized by a maximum state-of-charge value and a minimum state-of-charge value;

receiving data signals from said generator, said global positioning system, said thermometer, and said solar irradiance sensor, said generator measuring generator loads, said global positioning system measuring location, said thermometer measuring temperature, said solar irradiance sensor measuring solar irradiance;

accessing a historic database relating to said generator loads, said location, said temperature, and said solar irradiance;

predicting a solar profile and a generator load profile, said predicting based on said historic database;

determining an optimized said maximum state-of-charge value and an optimized said minimum state-of-charge value, said determining based on the predicted said solar profile, the predicted said generator load profile, the measured said location, the measured said temperature, and the measured said solar irradiance;

transmitting control signals to said power manager for varying at least one of said maximum state-of-charge value and said minimum state-of-charge value, said transmitting of said control signals based on the optimized said maximum state-of-charge value and the optimized said minimum state-of-charge value;

wherein said maximum state of charge value is a variable maximum state-of-charge value, and wherein said minimum state of charge value is a variable minimum state-of-charge value.

14. A computer-implemented method for using hybrid power, the computer-implemented method comprising:

establishing a battery-charging range for a generator, said battery-charging range characterized by a maximum state-of-charge value and a minimum state-of-charge value;

receiving data signals from said generator, a global positioning system, a thermometer, and a solar irradiance sensor, said generator measuring generator loads, said global positioning system measuring location, said thermometer measuring temperature, said solar irradiance sensor measuring solar irradiance;

accessing a historic database relating to said generator loads, said location, said temperature, and said solar irradiance;

predicting a solar profile and a generator load profile, said predicting based on said historic database;

determining an optimized said maximum state-of-charge value and an optimized said minimum state-of-charge value, said determining based on the predicted said solar profile, the predicted said generator load profile, the measured said location, the measured said temperature, and the measured said solar irradiance;

transmitting control signals to said power manager for varying at least one of said maximum state-of-charge value and said minimum state-of-charge value, said transmitting of said control signals based on the optimized said maximum state-of-charge value and the optimized said minimum state-of-charge value;

wherein said maximum state of charge value is a variable maximum state-of-charge value, and wherein said minimum state of charge value is a variable minimum state-of-charge value.

\* \* \* \* \*